(12) United States Patent
Park (10) Patent No.: US 6,771,612 B1
(45) Date of Patent: Aug. 3, 2004

(54) FULL DUPLEX INTERFACE APPARATUS FOR A HIGH PERFORMANCE SERIAL BUS USING A PORT SWITCH

(75) Inventor: Seong-Hyun Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/421,660

(22) Filed: Oct. 20, 1999

(30) Foreign Application Priority Data

Oct. 21, 1998 (KR) .......................................... 98-44120

(51) Int. Cl.[7] ................................................ H04L 5/14
(52) U.S. Cl. ...................... 370/276; 370/293; 370/402; 370/420; 370/463; 370/489
(58) Field of Search ................................ 370/489, 498, 370/293, 294, 401, 402, 408, 362, 257, 276, 419, 420, 421, 463; 348/553, 705, 706; 710/305

(56) References Cited

U.S. PATENT DOCUMENTS

| | | | | |
|---|---|---|---|---|
| 5,640,392 A | * | 6/1997 | Hayashi | 370/465 |
| 5,710,773 A | * | 1/1998 | Shiga | 370/362 |
| 5,838,248 A | * | 11/1998 | Nagano | 340/825.03 |
| 6,034,732 A | * | 3/2000 | Hirota et al. | 348/441 |

OTHER PUBLICATIONS

TSB12C01A Data Manual, IEEE 1394–1995 High Speed Serial–Bus Link Layer Controller, Texas Instrument, pp. 1–59, Nov. 1998.*

* cited by examiner

*Primary Examiner*—Seema S. Rao
*Assistant Examiner*—Frank Duong
(74) *Attorney, Agent, or Firm*—Myers Bigel Sibley & Sajovec (57) ABSTRACT

A full duplex interface apparatus for a high performance serial bus is provided. More particularly, an IEEE 1394 interface apparatus is provided which includes a port switch having two ports coupled to a source generator device and a display device and separately receiving and buffering received signal packet data streams from the physical layer and transmit signal packet data streams for transmission over the physical layer. Accordingly, by coupling the source generator unit which generates signals for transmission over the physical layer through a first port of the port switch and the display unit to a second port of the port switch, ISO signals such as video signals may be received from the physical layer and provided to the display unit at the same time as ISO signals are being transmitted from the source generator unit to the physical layer through the port switch.

23 Claims, 10 Drawing Sheets

FULL DUPLEX INTERFACE APPARATUS FOR A HIGH PERFORMANCE SERIAL BUS USING A PORT SWITCH

FIELD OF THE INVENTION

The present invention relates to interface devices and more particularly to full duplex interface devices.

BACKGROUND OF THE INVENTION

The introduction of various new computer/processor and communication technologies has increasingly led to a demand for communication interfaces to a variety of devices, such as electric home appliances, in addition to conventional computer devices. More particularly, one specific area where such technology has been applied is for communication of digital video media data between various devices within a user's home. Examples of currently developed products which support such communications are set top boxes using the Moving Picture Expert Group-2 Transfer Stream (MPEG-2 TS) protocol, televisions, digital video cassette recorders (DVCR), digital video camcorders (DVC), controllers interfacing between computers and peripheral equipment and various data interface methods and devices.

One standard in particular which has been developed for providing cost effective interconnections between computer peripherals and consumer electronics is the Institute of Electrical and Electronic Engineers (IEEE) 1394 standard for high performance serial buses. Various consumer type devices have been introduced which incorporate an IEEE 1394 compliant interface to support communications.

Figure 1:
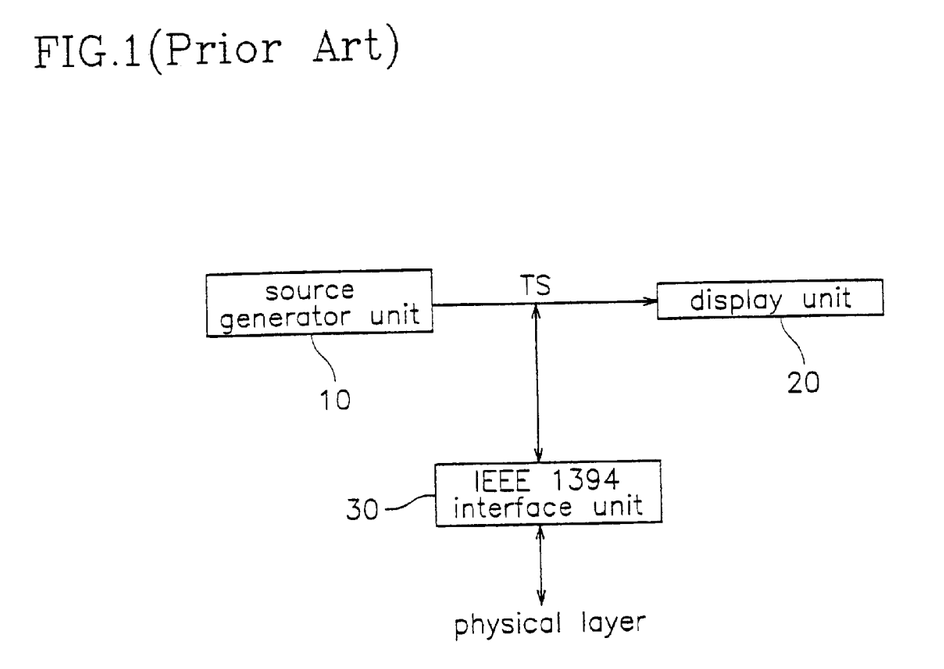
FIG. 1 is a block diagram of an interface according to the IEEE 1394 standard.

FIG. 1 is a block diagram which illustrates a conventional application using an IEEE 1394 compliant interface. As shown in FIG. 1, the IEEE 1394 interface unit 30 is connected to a source generator unit 10 and a display unit (or, alternatively, a storage unit) 20. The source generator unit 10 generates video signals in, for example, a transfer stream (TS) format. The generated signals are transmitted to the display unit 20 and further may be transmitted to a physical layer, such as an IEEE 1394 compliant cable, through the IEEE 1394 interface unit 30. The display unit 20 displays the video signals which are transmitted from the source generator unit 10, or, alternatively, may display signals received from another device (not shown) over the physical layer through the IEEE 1394 interface unit 30. The IEEE 1394 interface unit 30 in a first mode links signals provided from the source generator unit 10 to the physical layer. In a second mode (or direction) the IEEE 1394 interface unit 30 links signals provided from the physical layer to the display unit 20 or other devices on the source generator side of the IEEE 1394 interface unit 30.

Figure 2:
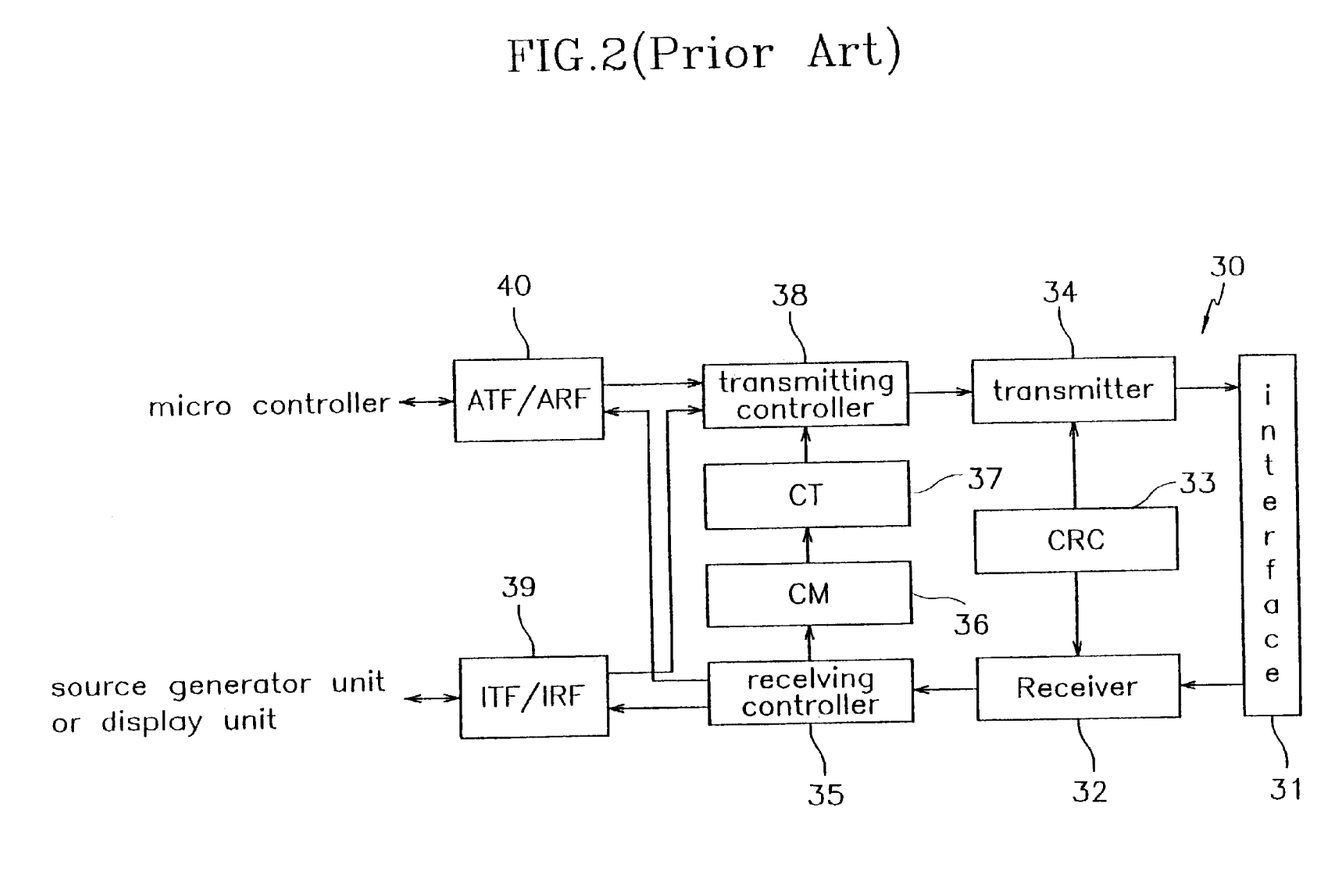
FIG. 2 is a block diagram further detailing the interface of FIG. 1.

Referring now to FIG. 2, a more detailed block diagram is provided illustrating the conventional IEEE 1394 interface unit 30 of FIG. 1. As shown in FIG. 2, the IEEE 1394 interface unit 30 includes an interface 31, a receiver 32, a cycle redundancy checker (CRC) 33, a transmitter 34, a receiving controller 35, a cycle monitor (CM) 36, a cycle timer (CT) 37, a transmitting controller 38 and buffers 39, 40. When signals are received from the physical layer, the received signals are provided to the receiver 32 through the interface 31. The CRC 33 checks for errors in the received signals so as to indicate a failure in receipt of a signal.

As known to those of skill in the art, both asynchronous and isochronous (ISO) signals are supported under the IEEE 1394 standard. Isochronous signals, such as video signals, are provided to the buffer 39 through the receiving controller 35. The asynchronous signals are provided to the buffer 40 through the receiving controller 35. Furthermore, the receiving controller 35 provides the signals from the receiver 32 to the cycle monitor 36. In turn, the cycle monitor 36 monitors the timing of the received signals.

The buffer 39 is generally provided as a first-in first-out (FIFO) memory unit which temporarily stores received and transmitted ISO signals. During operations related to receiving signals from the physical layer, the buffer 39 functions as an isochronous receiving FIFO (IRF) memory unit. During operations related to transmitting signals onto the physical layer, the buffer 39 functions as an isochronous transmitting FIFO (ITF) memory unit. As noted previously with reference to FIG. 1, when the received ISO signals are read back out of the buffer 39, they are generally transmitted to the display unit 20.

The buffer 40 may also be provided by FIFO memory units which operate to temporarily store received and transmitted asynchronous signals. Accordingly, during operations related to receipt of asynchronous signals from the physical layer, the buffer 40 functions as an asynchronous receiving FIFO (ARF) memory unit and, during operations related to transmission of signals onto the physical layer, the buffer 40 functions as an asynchronous transmitting FIFO (ATF) memory unit. Generally, received asynchronous signals which are passed through the buffer 40 are transmitted to a controller device which controls operations of the system including the source generator unit 10 and display unit 20 of FIG. 1. While not illustrated in FIG. 1, it is to be understood that the controller device receiving such asynchronous signals can be a variety of devices known to those of ordinary skill in the art.

As noted above, ISO signals, such as video signals, generated by the source generator unit 10, are temporarily stored in the buffer 39 before transmission over the physical layer. Accordingly, as ISO signals flow both to and from the source generator unit 10, a bidirectional port is used to interface the source generator unit 10 and display unit 20 to the buffer 39 so that ISO signals may be both transmitted and received to/from the source generator unit 10 and the display unit 20, respectively. Accordingly, the ISO signals may be bidirectionally transmitted and received through the buffer 39. However, in the illustrated conventional IEEE 1394 interface unit 30, the ISO signals cannot be bidirectionally transmitted and received concurrently as there is no support provided for such full duplex operations.

It is further to be understood that, during operations, the circuit of FIG. 2 passes ISO signals from the source generator unit 10 through the buffer 39 to the transmitter 34 through the transmitting controller 38. In turn, the transmitting controller 38 tunes the synchronizing timing of the ISO transmitted signals responsive to timing information provided from the cycle timer 37. The transmitting controller 38 then provides the tuned signals to the transmitter 34. Finally, the timing-tuned ISO signals output from the transmitter 34 are combined with CRC-signals for use in error checking which are provided by the CRC 33 before transmission of the ISO signals to the physical layer through the interface 31.

Figure 3A:
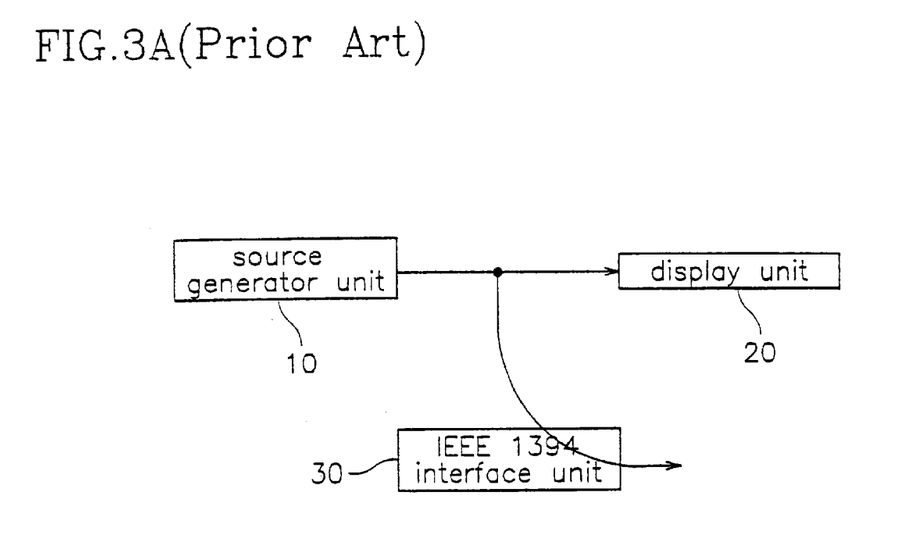
FIGS. 3*a* and 3*b* are block diagrams illustrating respectively transmit and receive operations according to the IEEE 1394 standard.
Figure 3B:
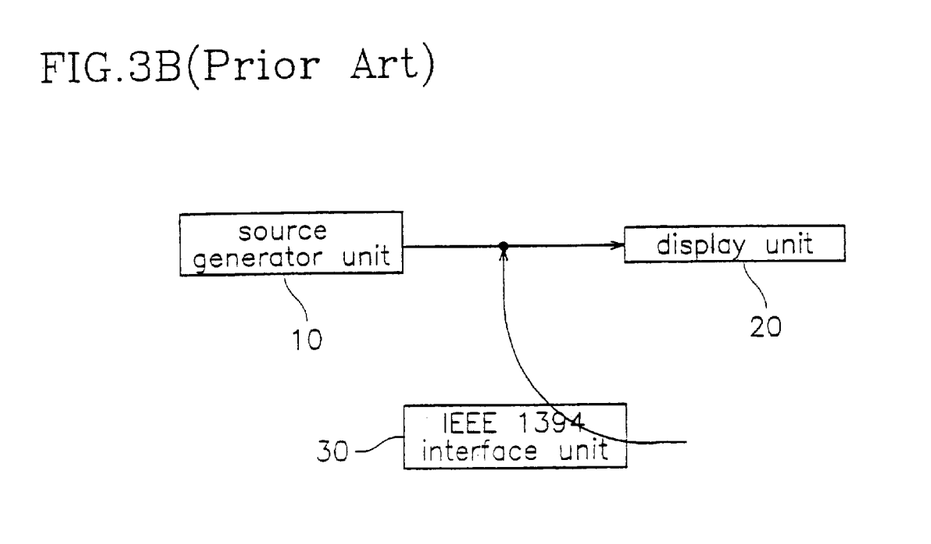

The half duplex communication operations of the conventional IEEE 1394 interface unit 30 are further illustrated in FIGS. 3a and 3b. As shown in FIG. 3a, video signals generated in the source generator unit 10 may be transmitted to the display unit 20 and concurrently transmitted to other devices, such as other home appliances, through the IEEE 1394 interface unit 30 and over the physical layer. As shown in FIG. 3*b*, video signals provided from an external device, such as a home appliance, and provided over the physical layer are transmitted to the display unit 20 through the IEEE 1394 interface unit 30. However, as the illustrated conventional IEEE 1394 interface unit 30 has only a single, bidirectional port, it is generally not possible to transmit signals generated in the source generator unit 10 to the physical layer through the IEEE 1394 interface unit 30 while concurrently transmitting the signals provided from the physical layer to the display unit 20. In other words, while half duplex communication is supported, full duplex communication is not supported.

SUMMARY OF THE INVENTION

It is, therefore, an object of the present invention to provide an interface for a high performance serial bus which may allow full duplex communications.

In order to provide for the foregoing objective, a full duplex interface apparatus for a high performance serial bus is provided. More particularly, an IEEE 1394 interface apparatus is provided which includes a port switch having two ports coupled to a source generator device and a display device and separately receiving and buffering received signal packet data streams from the physical layer and transmit signal packet data streams for transmission over the physical layer. Accordingly, by coupling the source generator unit which generates signals for transmission over the physical layer through a first port of the port switch and the display unit to a second port of the port switch, ISO signals such as video signals may be received from the physical layer and provided to the display unit at the same time as ISO signals are being transmitted from the source generator unit to the physical layer through the port switch.

In one embodiment of the present invention, a full duplex interface apparatus for a higher performance serial bus, such as an IEEE 1394 protocol serial bus, is provided. The interface includes an interface circuit having a transmit signal output coupled to the high performance serial bus and a receive signal input coupled to the high performance serial bus. The interface circuit is configured to receive isochronous signals from the high performance serial bus on the receive signal input and to transmit isochronous signals to the high performance serial bus on the transmit signal output. A port switch is coupled to the interface circuit which has a first port and a second port, the first port and the second port being coupled to a source generator unit. The port switch is configured to support full duplex communication of isochronous signals between the high performance serial bus and the source generator through the first port and the second port.

In one embodiment, the isochronous signals are video signals. The isochronous signals may be provided in a packet which includes a time stamp indicating location information for the packet relative to other packets communicated over the high performance serial bus. In this embodiment, the interface circuit includes a packet reconstruction circuit configured to read the time stamp from a received packet and determine a desired location for the received packet and a time stamp insertion circuit configured to add a time stamp to a transmit packet indicating location information for the transmit packet relative to other packets generated by the source generator. In a further embodiment, the interface circuit further includes a receive buffer that stores isochronous signals received from the high performance serial bus and a transmit buffer separate from the receive buffer that stores isochronous signals received from the source generator.

In a further embodiment of the present invention, the first port is a bidirectional port and the second port is a unidirectional port supporting communication of isochronous signals from the source generator to the high performance serial bus. The first port supports communication of isochronous signals from the high performance serial bus to the source generator during full duplex operations of the apparatus. The interface circuit in a further embodiment includes an IEEE 1394 compliant connector and the transmit signal output and the receive signal input are coupled to the high performance serial bus through the IEEE 1394 compliant connector.

In a further embodiment of the present invention, the port switch includes a first logic AND gate having a first input coupled to the receive signal input and a second input coupled to a first enable signal. A first transmit gate is coupled to an output of the first logic AND gate which is responsive to a second enable signal, the first transmit gate providing a high impedance at an output of the first transmit gate when the second enable signal is deactivated, the output of the first transmit gate being coupled to the first port. A second logic AND gate having a first input coupled to the first port and a second input coupled to the first enable signal and an output coupled to the transmit signal output is included. The receive signal input is coupled to the second port.

In another embodiment, a buffer is provided having an input coupled to the first port. In addition, a multiplexer having a first input port coupled to the receive signal input and a second input coupled to an output of the buffer is provided as well as a second transmit gate having an input coupled to an output of the multiplexer and being responsive to a third enable signal and having an output coupled to the second port. The first input of the second logic AND gate is coupled to an output of the buffer.

In yet another embodiment, an asynchronous signal interface circuit is provided which is coupled to the high performance serial bus and configured to receive asynchronous signals from the high performance serial bus. The asynchronous signal interface circuit may include an interface having an output coupled to a controller associated with the source generator, a receive buffer coupled between the high performance serial bus and a first input of the interface and a transmit buffer coupled between the high performance serial bus and a second input of the interface.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout and signal lines and signals thereon may be referred to by the same reference symbols.

Figure 4:
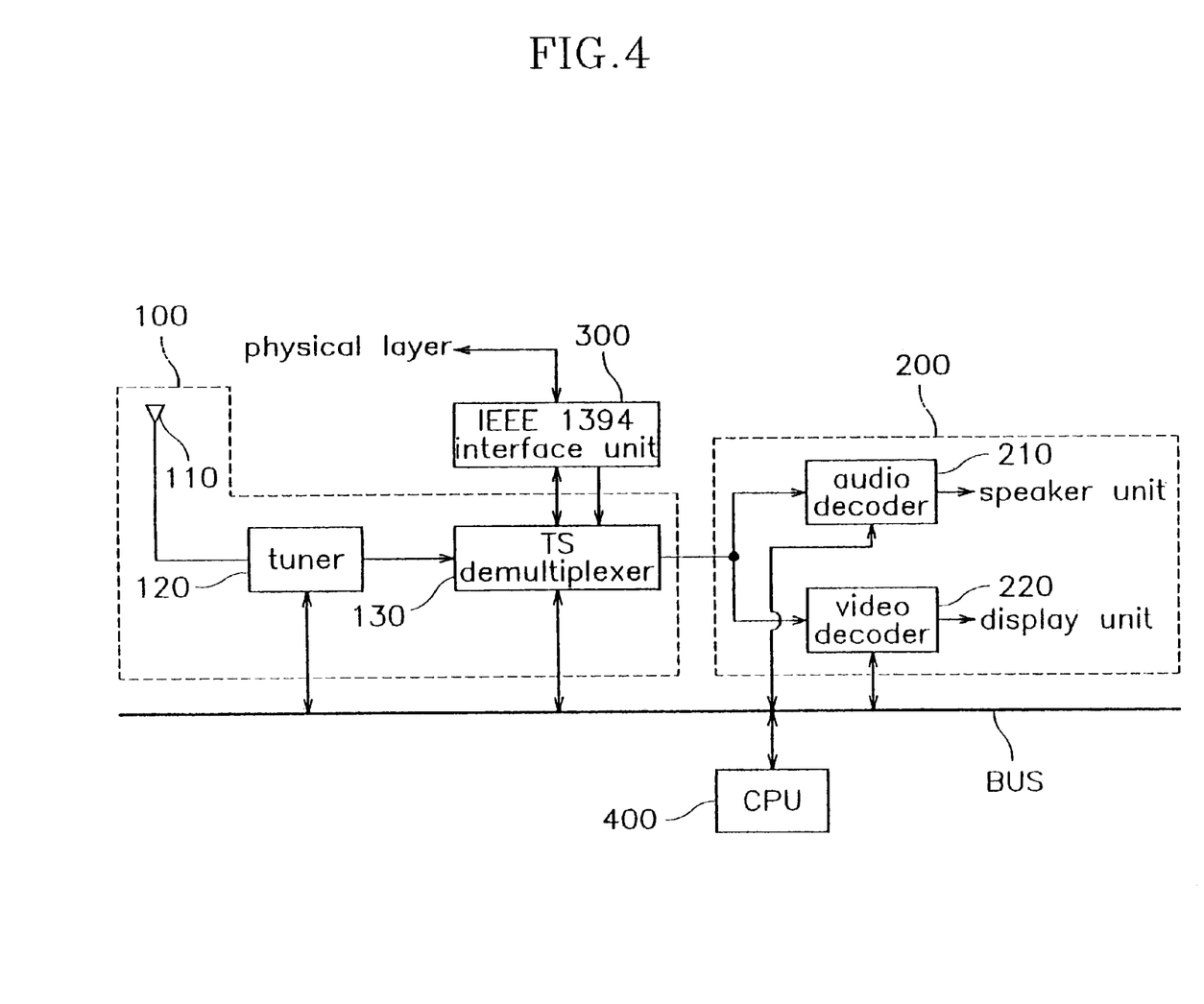
FIG. 4 is a block diagram of a digital TV system including a full duplex interface apparatus according to an embodiment of the present invention.

The full duplex interface apparatus for a higher performance serial bus of the present invention will now be described with reference to the block diagram of FIG. 4 which illustrates a digital television (TV) system including an interface apparatus according to an embodiment of the present invention. As shown in FIG. 4, the digital tv system includes a source generator unit 100 and a display unit 200. The digital tv system further includes an IEEE 1394 interface apparatus 300 and a controller or central processing unit (CPU) 400. The source generator unit 100, in turn, includes an antenna 110, a tuner 120 and a demultiplexer 130. The display unit 200 includes an audio decoder 210 and a video decoder 220. The CPU 400 is coupled to the source generator unit 100 and the display unit 200 over a data communication bus (BUS).

The antenna 110 receives signals, such as radio frequency (RF) signals, through, for example, digital satellite transmissions or over air transmissions. Alternatively, signals could be received through non-wireless media such as a cable coupling instead of an antenna 110. The tuner 120 selects desired channels among the received signals from the antenna 110 and transforms the selected signals into intermediate frequency (IF) signals. The tuner 120 may further execute various signal processing operations on the received signals such as executing a forward error correction (FEC) procedure on the IF signals. As shown, operations of the tuner 120 may be controlled by the CPU 400 over the BUS.

The demultiplexer 130 selects desired programs from among the signals output from the tuner 120. As shown in the embodiment of FIG. 4, the demultiplexer 130 may further divide the selected signals into audio signals and video signals which are output, after being divided, to the audio decoder 210 and the video decoder 220, respectively. As shown in FIG. 4, the demultiplexer 130 also transmits selected signals received from the tuner 120 to the physical layer (such as an IEEE 1394 cable) through the IEEE 1394 interface apparatus 300. In addition, the demultiplexer 130 divides external signals received from the physical layer through the IEEE 1394 interface apparatus 300 into audio signals and video signals and transmits the divided signals to the audio decoder 210 and the video decoder 220 respectively. The signals may be provided over a TS format connection and the demultiplexer 130 may be a TS demultiplexer.

The audio decoder 210 and the video decoder 220 respectively decode the audio signals and video signals received from the demultiplexer 130 and output the decoded signals to a speaker and a display device respectively. As noted with respect to the tuner 120 previously, the CPU 400 controls the tuner 120, the demultiplexer 130, the audio decoder 210 and the video decoder 220 through the BUS.

The IEEE 1394 interface apparatus 300 in the illustrated embodiment of FIG. 4 is configured to transmit signals to the demultiplexer 130 from the physical layer and to concurrently transmit signals to the physical layer from the demultiplexer 130. Accordingly, the IEEE 1394 interface apparatus 300 supports full duplex communications.

Figure 5:
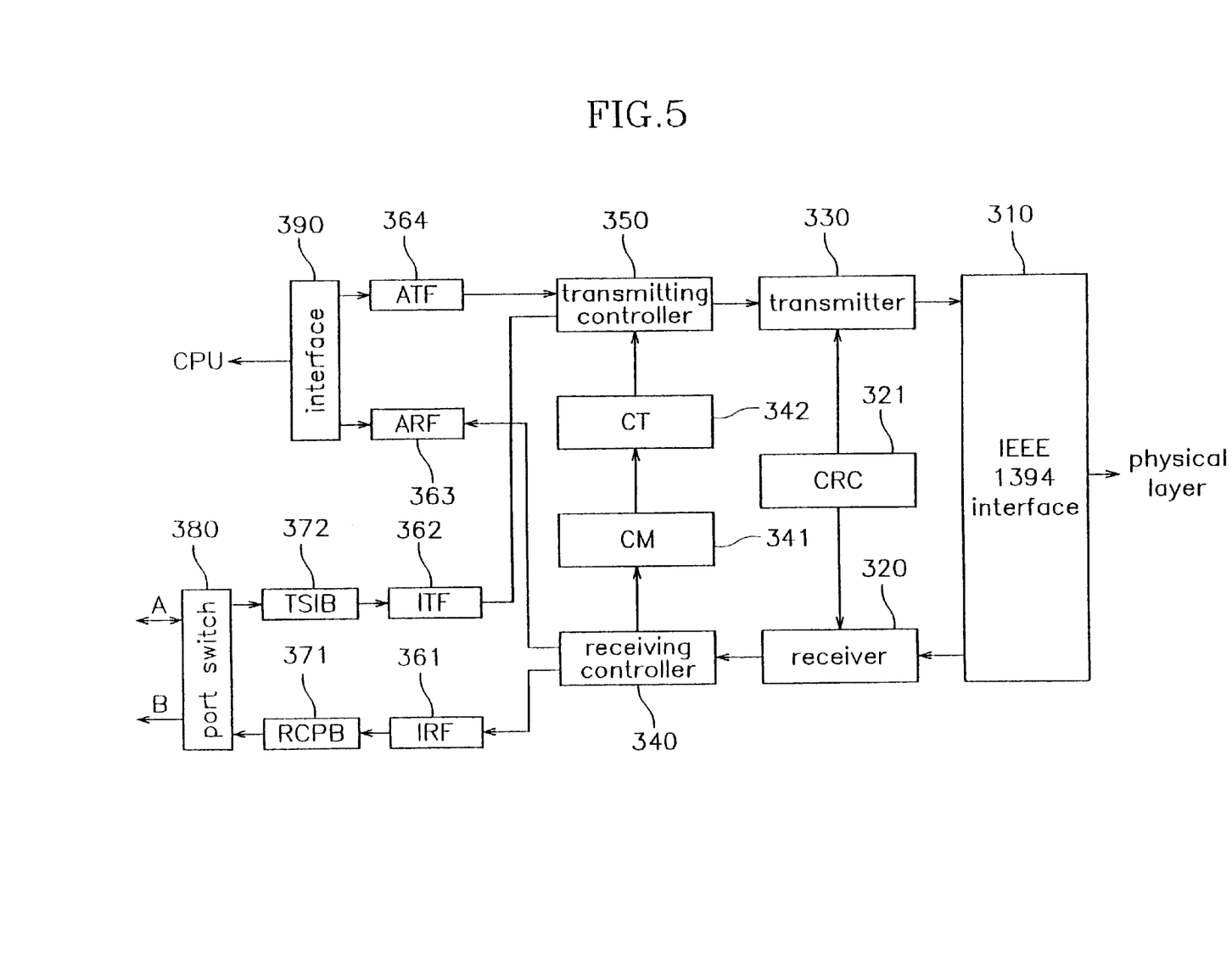
FIG. 5 is a block diagram further detailing the full duplex interface apparatus of FIG. 4.

The IEEE 1394 interface apparatus 300 will now be further described with reference to the block diagram of FIG. 5. As shown in the embodiment of FIG. 5, the IEEE 1394 interface apparatus 300 includes an IEEE 1394 interface 310, a receiver 320, a cyclical redundancy check (CRC) 321, a transmitter 330, a receiving controller 340, a cycle monitor (CM) 341, a cycle timer (CT) 342, a transmitting controller 350, an isochronous receive first-in first-out (IRF) buffer 361, an isochronous transmit first-in first-out (ITF) buffer 362, an asynchronous receive first-in first-out (ARF) buffer 363, an asynchronous transmit first-in first-out (ATF) buffer 364, a reconstruction packet block (RCPB)(packet reconstruction circuit) 371, a time stamp insertion block (circuit) (TSIB) 372, a port switch 380 and an interface 390. The illustrated components provide an interface circuit coupling the port switch 380 to the physical layer (which may be a high performance serial bus implemented using an IEEE 1394 cable).

While not shown in FIG. 5, the first port A and the second port B of the port switch 380, in operation, are coupled to the source generator unit 100 and the display unit 200 such as through the demultiplexer 130 as illustrated in FIG. 4. It is further to be understood from the embodiment of FIG. 5 that the interface 310 may be an IEEE 1394 compliant connector coupling transmit signal outputs and received signal inputs for the IEEE 1394 interface apparatus 300 to the high performance serial bus as indicated by the physical layer notation in FIG. 5.

Signals transmitted from the physical layer are provided to the receiver 320 through the IEEE 1394 interface 310. The CRC 321 checks for errors in the received signals to determine if any failures have occurred during signal receipt. The CRC 321 may further remove any received signal packets wherein the data does not pass the CRC error check.

Where the received signal is an ISO signal, such as a video signal, after CRC check, the received signal data packet is transmitted to the buffer 361 through the receiving controller 340. Similarly, received asynchronous signals are transmitted to the ARF buffer 363 through the receiving controller 340. Accordingly, the receiving controller 340 provides for separation of processing of asynchronous and ISO signals. The receiving controller 340 further provides received signals to the cycle monitor 341. The cycle monitor 342 monitors the timing of the received signals.

Received signals from the IRF buffer 361 are analyzed by the RCPB 371 to read the time stamp information from the ISO signals which are passed through the IRF buffer 361. The RCPB 371 further reconstructs the locations of respective received ISO data packets and transmits the reconstructed signals to the port switch 380. In other words, the RCPB 371 operates to provide received ISO packets to the port switch 380 in the designated order specified by the time stamp information contained in the packets.

The reconstructed received signals provided to the port switch 380 by the RCPB 371 are, in turn, provided to the demultiplexer 130 through port A or port B of the port switch 380. Note that, in the illustrated embodiment of FIG. 5, port A is a bidirectional port and port B is a unidirectional port. As described with reference to FIG. 4, the signals provided to the demulitplexer 130 may subsequently be divided into audio signals and video signals and provided to devices, such as speakers or display units, through the audio decoder 210 and the video decoder 220, respectively.

The IEEE 1394 interface apparatus 300 further provides for transmission of asynchronous signals which are typically used for communications to a control device such as the CPU 400 of FIG. 4. As shown in FIG. 5, asynchronous signals which are passed through the ARF buffer 363 are provided to the CPU 400 of FIG. 4 through the interface 390.

During transmission of signals from a source generator unit 100, the ISO signals are transmitted from the demultiplexer 130 (FIG. 4) to the TSIB 372 through the bidirectional port A of the port switch 380. The TSIB 372 adds a time stamp to the ISO signals for use as header information which indicates a location of the packet data of the transmitted ISO signals relative to other packets of data. The TSIB 372 then provides the transmit packets to the ITF buffer 362. The ITF buffer 362 temporarily stores the transmitted ISO signal packets. The ISO signals from the ITF buffer 362 are, in turn, provided to the transmitter 330 through the transmitting controller 350. The transmitting controller 350 tunes the synchronizing timing of the ISO transmit signals responsive to timing information received from the cycle timer 342. The tuned signals are then provided to the transmitter 330 where a CRC signal from the CRC 321 is added for use in error detection. The ISO signal packets are then transmitted to the physical layer of the high performance serial bus through the IEEE 1394 interface 310.

Accordingly, by providing a port switch 380 which includes both a bidirectional port A and a separate unidirectional port B, full duplex communication between the physical layer and the demultiplexer 130 (FIG. 4) may be provided. Full duplex communications are supported by using the bidirectional port A of the port switch 380 for transmitting signals from the source generator unit 100 to the physical layer when there is a concurrent receipt of communications from the physical layer which is passed through port B of the port switch 380 to provide the received signals from the physical layer to the display unit 200.

Figure 6:
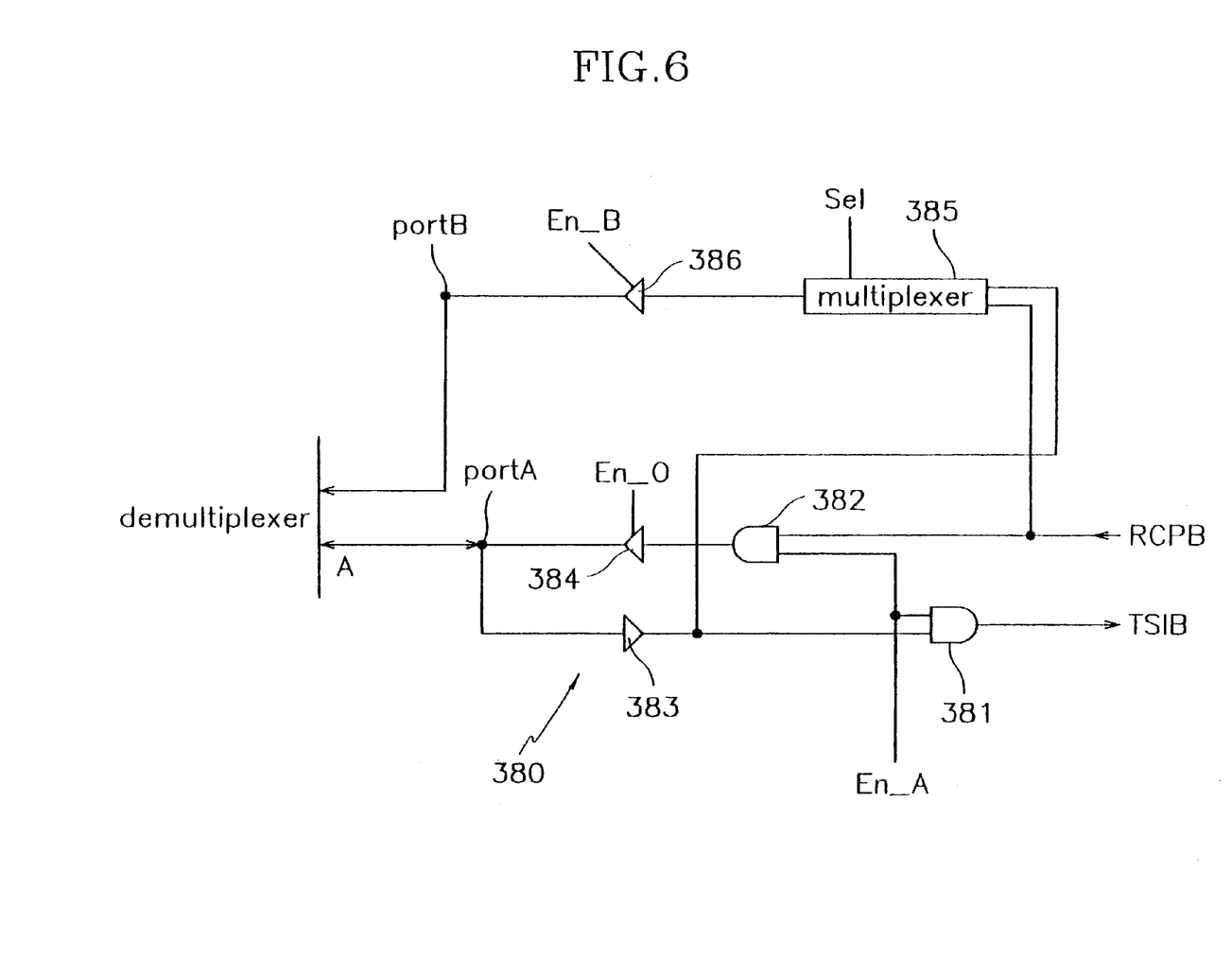
FIG. 6 is a schematic circuit diagram of the port switch of FIG. 5.

The port switch 380 of the embodiment of FIG. 5 will now be further described with reference to FIG. 6 which is a schematic circuit diagram of an embodiment of the port switch 380. As shown in the embodiment of FIG. 6, the port switch 380 includes logical AND gates 381 and 382, a multiplexer 385, transmitting gates 384 and 386 and a buffer 383. The output of the RCPB 371 is coupled to a first input of the logical AND gate 382 and also to an input terminal of the multiplexer 385. As will be described further herein, these connections, respectively, provide for routing of ISO signals received from the physical layer through the port switch 380 to either the unidirectional port B or the bidirectional port A. A second input terminal of the logical AND gate 382 is coupled to a first enable signal En_A which is the enable signal for port A of the port switch 380. The enable signal En_A is also provided as an enabling input to an input terminal of the logical AND gate 381. Accordingly, the enable signal En_A provides an enable for both receive and transmit direction flows from port A of the port switch 380.

An output signal from the logical AND gate 382 is, in turn, provided to the transmitting gate 384. The transmitting gate 384 is enabled by an enable signal En_0 which controls whether the output signal from the transmitting gate 384 is activated for transmission of a signal through the transmission gate 384. When the enable signal En_0 is not activated, the transmitting gate 384 provides a high impedance output isolating the logical AND gate 382 from port A of the port switch 380. As shown in FIG. 6, the output of the transmitting gate 384 is coupled to port A of the port switch 380 so as to be provided to the demultiplexer 130 (FIG. 4).

ISO signals provided from the demultiplexer 130 or other source generator unit may be provided to the buffer 383 as an input of the buffer 383 is coupled to bidirectional port A of the port switch 380. The output of the buffer 383 is, in turn, connected to an input terminal of the logical AND gate 381 and is also provided to an input terminal of the multiplexer 385. The output of the logical AND gate 381 is, in turn, coupled to the TSIB 372 (FIG. 5). Accordingly, signals received from a source generator through port A of the port switch 380 may be output to the TSIB 372 and may further be routed back through the port switch 380 to port B of the port switch 380.

The multiplexer 385 outputs one of the two signals which are provided to its respective input terminals based on a designation indicated by a selection signal SEL. Accordingly, the multiplexer 385 may output either a received ISO signal from the RCPB 371 or a signal received from port A of the port switch 380. The output signal of the multiplexer 385 is provided to the demultiplexer 130, for example, for delivery to a display unit, through the transmitting gate 386 and the unidirectional port B of the port switch 380. As shown in the embodiment of FIG. 6, the transmitting gate 386 is enabled responsive to an enable signal En_B which is the port B enable signal.

As will be understood to one of ordinary skill in the art, the port switch 380 as illustrated in FIG. 6 allows transmission of various signals depending upon the states of the enable signals En_A, En_B, En_0 and the selection signal provided to the multiplexer 385. For example, the ISO receive signals from the RCPB 371 may be routed to port B of the port switch 380 when the enable signal En_B is activated and the multiplexer selects the RCPB input. Similarly, ISO signals output from a source generator unit through port A of the port switch 380 may be routed to port B of the port switch 380 when the enable signal En_B is activated, the multiplexer 385 selects the input coupled to the buffer 383 and the En_0 enable signal is deactivated. The ISO signals from the RCPB 371 may also be routed to port A of the port switch 380 when the enable signal En_A is activated and the enable signal En_0 is activated. Finally, ISO signals from port A of the port switch 380 may be output to the TSIB 372 when the enable signal En_A is activated and the enable signal En_0 is deactivated. It is further to be understood that various combinations of the above routings may be concurrently provided, thereby providing the full duplex routing capability of the present invention.

Figure 7A:
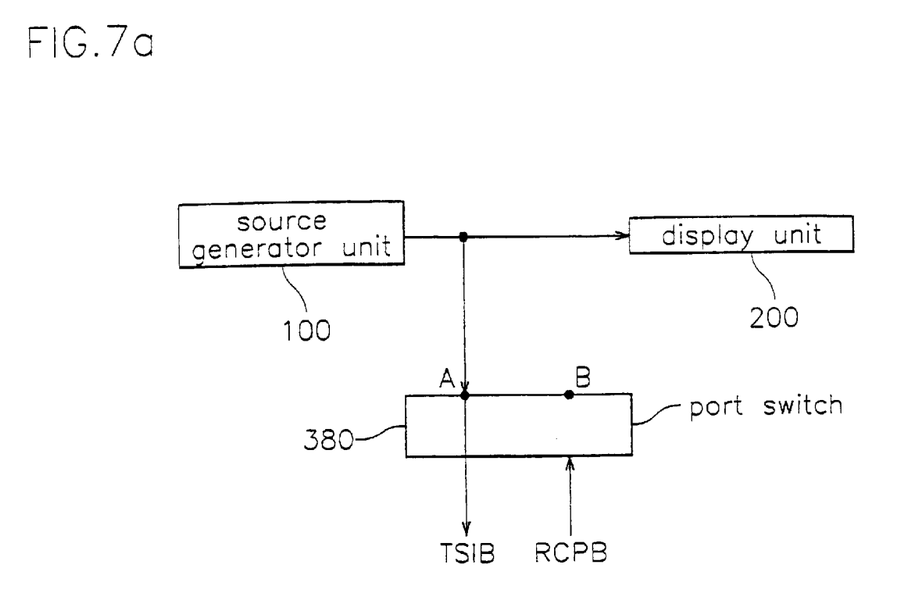
FIGS. 7*a* through 7*g* are block diagrams illustrating operations of an embodiment of the full duplex interface apparatus of the present invention.

Signal routing under various combinations of states of the above described enable signals from FIG. 6 will now be illustrated further with reference to the block diagrams of FIGS. 7a–7g. Referring first to FIG. 7a, ISO signals from the source generator unit 100 (through the demultiplexer 130) are provided to the TSIB 372 through port A of the port switch 380. However, in FIG. 7a, ISO signals from the RCPB 371 are not provided to the display unit 200. This condition may be provided by activating the enable signal En_A, thereby enabling logical AND gates 381 and 382, and further by deactivating the enable signals En_B and En_0, thereby preventing transmission from the transmitting gates 384 and 386.

For the illustrated embodiment of FIG. 6, references to "activating" herein refer to turning the state to a high signal state and "deactivating" refers to a low signal state. However, it is to be understood that the opposite logic may be used under various embodiments of the present invention wherein the circuits are designed to provide an active state with a low signal and a deactivated state with a high signal. However, for the sake of simplicity in understanding the various embodiments of FIGS. 7a–7g, references to the actived state will be used interchangeably with the high state and the low state will be used interchangeably with the deactivated state.

Figure 7B:
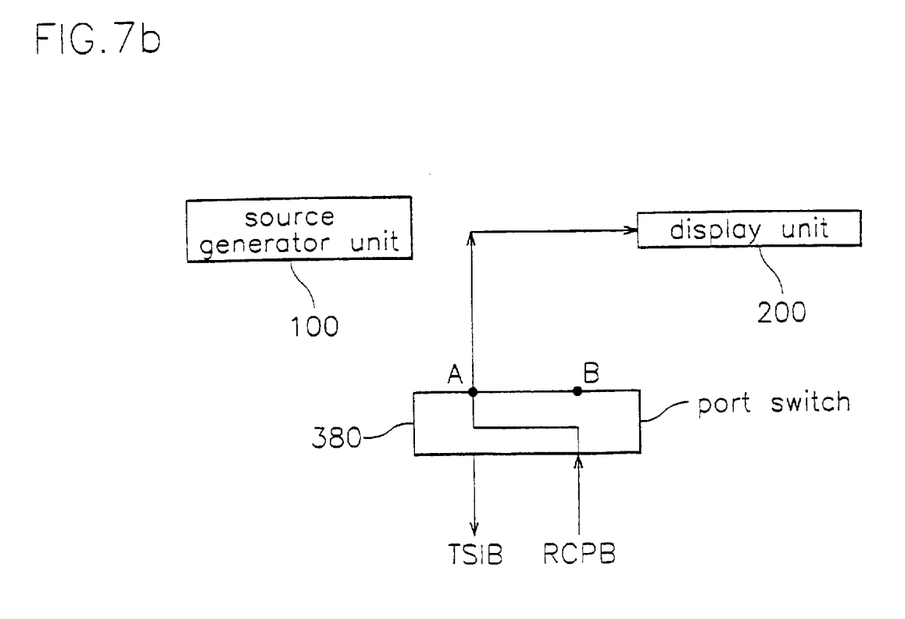

Referring now to FIG. 7b, signals from the RCPB 371 are routed to the display unit 200 through port A of the port switch 380. Accordingly, the enable signal En_A is set to a high state, thereby enabling the logical AND gates 381 and 382, and the enable signal En_0 is turned to a high state to enable transmission by the transmitting gate 384. The enable signal En_B is in the low state, thereby providing for no transmission by the transmitting gate 386.

Figure 7C:
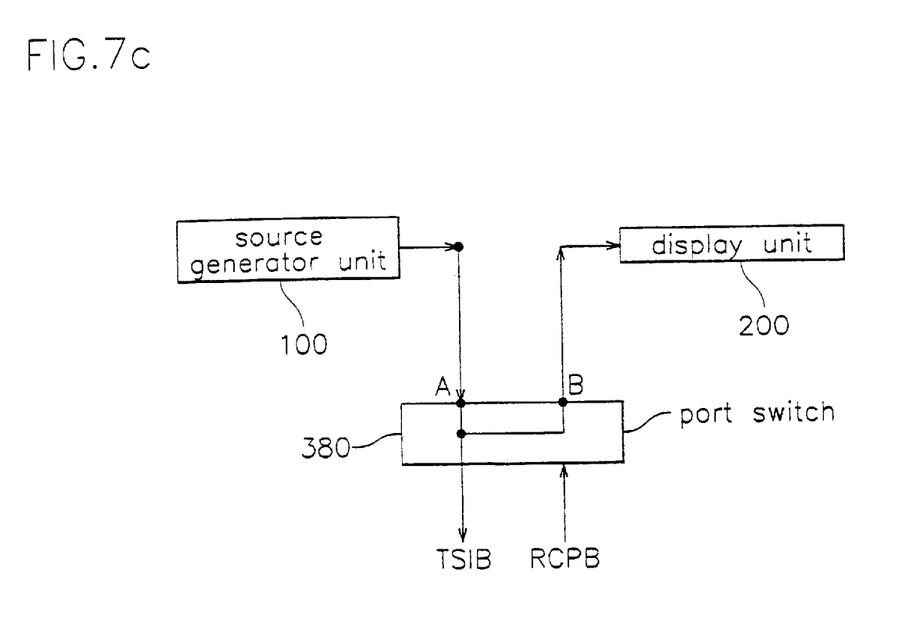

Referring now to FIG. 7c, ISO signals from the source generator unit 100 are shown as being routed from port A of the port switch 380 to the TSIB 372 and further back to port B of the port switch 380 to thereby provide the output of the source generator unit 100 to the display unit 200 as well as to the physical layer. This configuration is provided by setting the enable signal En_A to high, thereby enabling logical AND gate 381. In addition, the output signal of the transmitting gate 383 is selected through the selection signal of the multiplexer 385 and the transmitting gate 386 is enabled by setting the enable signal En_B to a high state. Accordingly, in the embodiment of FIG. 7c, the port switch 380 is used both to route signals to the physical layer as well as to couple the source generator unit 100 to the display unit 200. Note that in the embodiment of FIG. 7c, the enable signal En_0 is set to the low state.

Figure 7D:
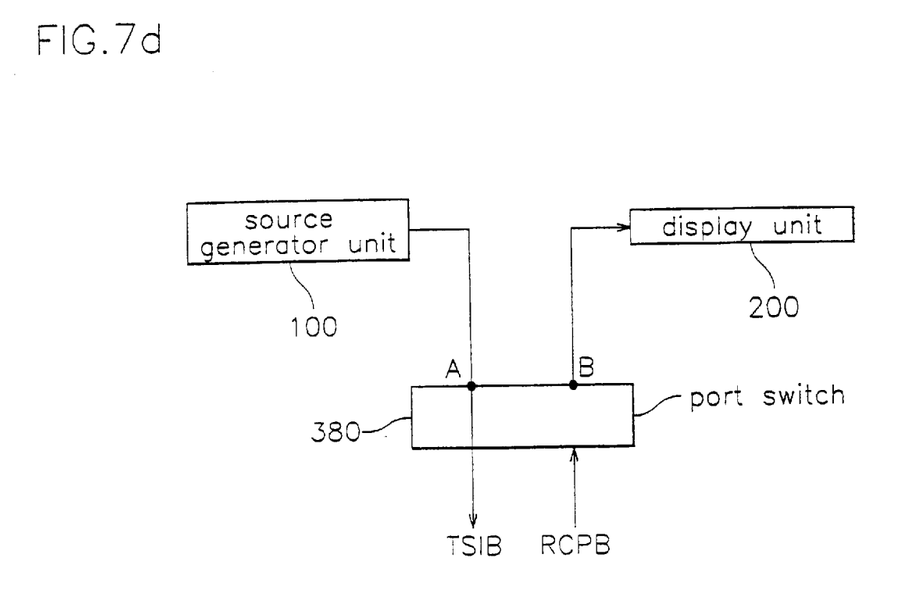
Figure 7E:
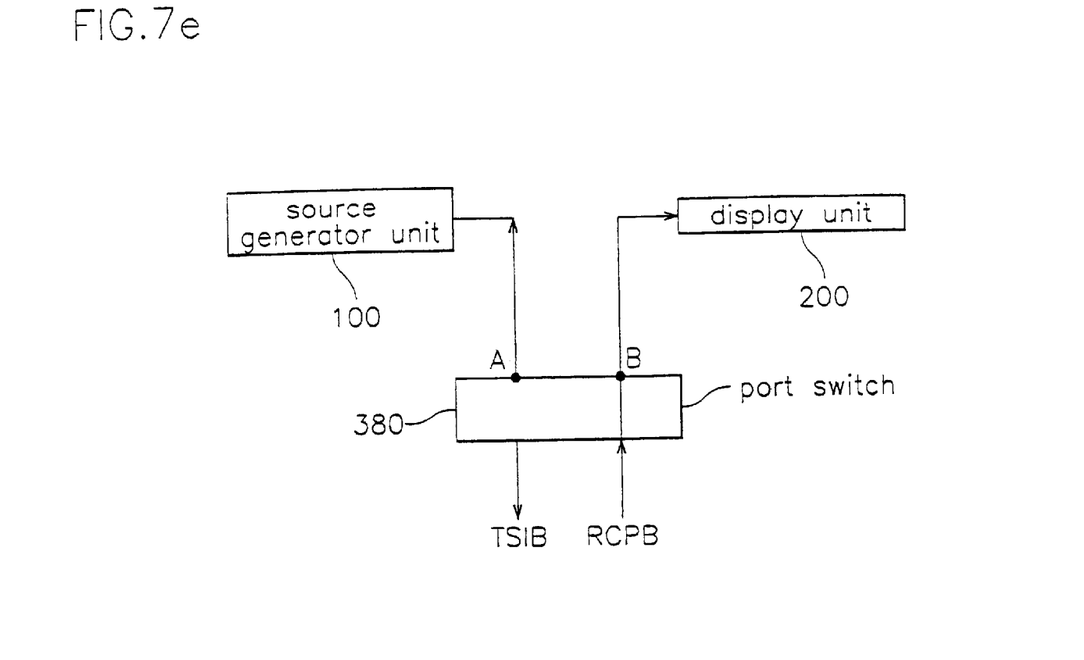

Referring now to FIG. 7d, the port switch 280 is configured as was previously described with reference to FIG. 7a. However, in the embodiment of FIG. 7d, unlike the embodiment of FIG. 7a, there is no coupling between the source generator 100 and the display unit 200 except that available through the port switch 380. In the embodiment of FIG. 7e, ISO signals from the RCPB 371 are provided to port B of the port switch 380. They are, in turn, provided to the display unit 200. This routing may be provided by setting the enable signal En_B to a high state and using the select line of the multiplexer 385 to select the RCPB input for transmission through the multiplexer 285. As shown in the embodiment of FIG. 7e, there is no connection established between port A and the TSIB 372 or the RCPB 371. The enable signal En_A is set to a low state.

Figure 7F:
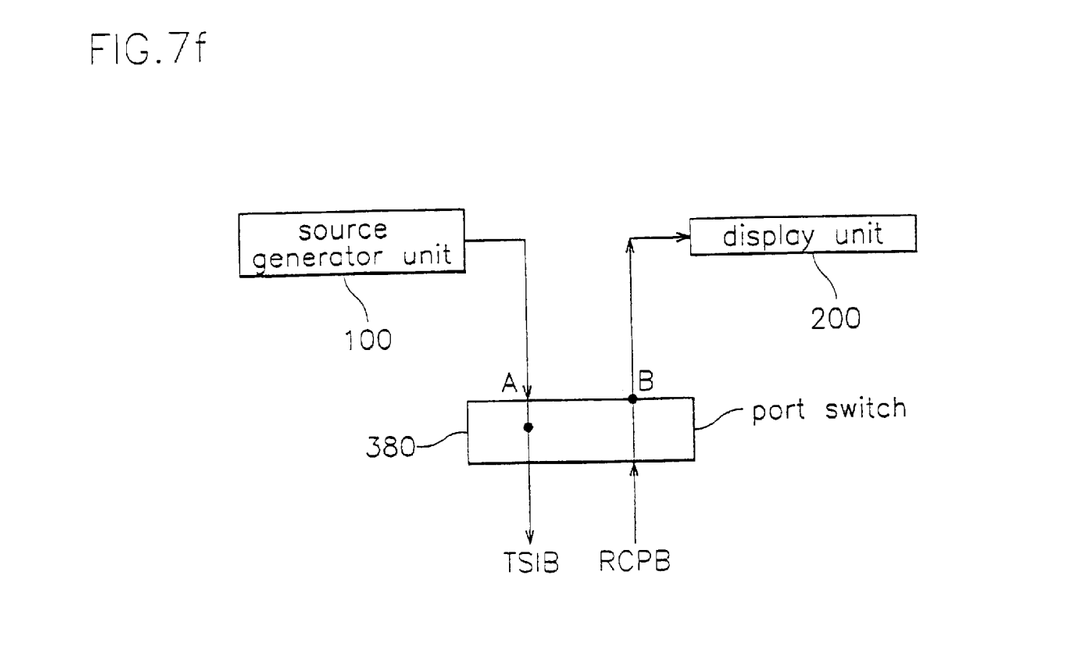
Figure 7G:
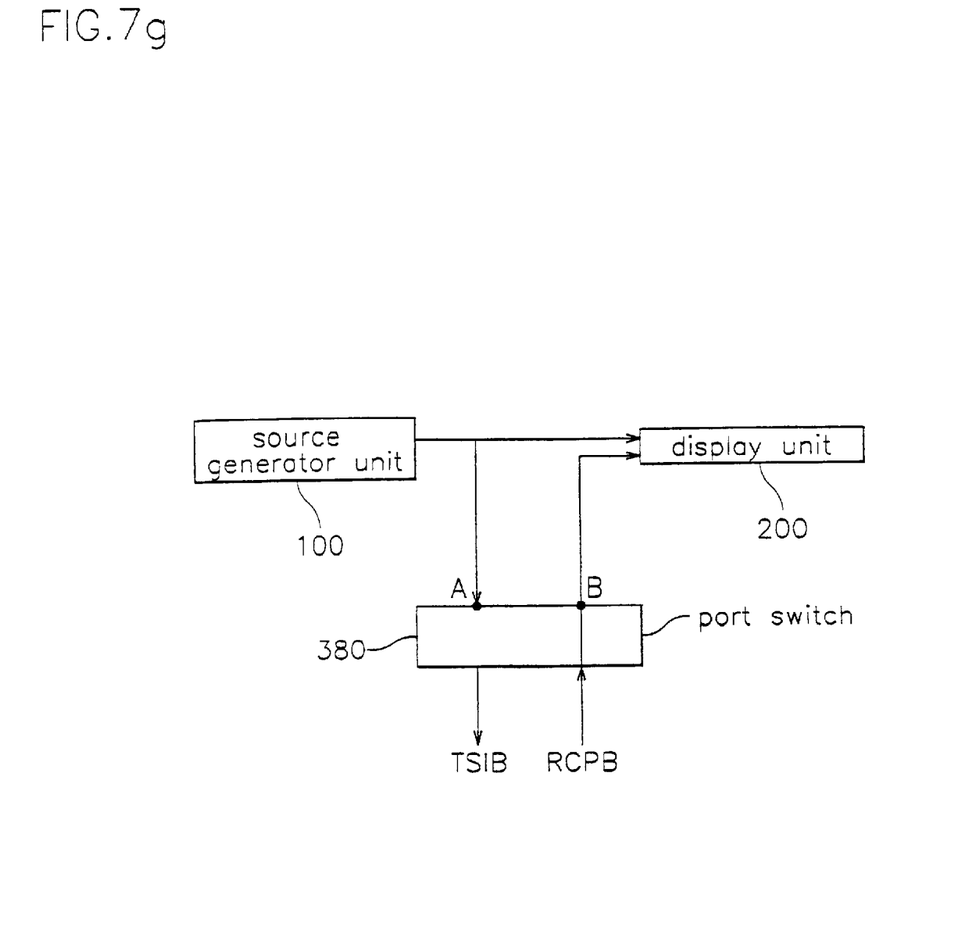

The embodiments of FIGS. 7f and 7g illustrate signal transmissions utilizing the full duplex capabilities of the present invention. As shown in FIG. 7f, transmission of signals from the source generator unit 100 to the TSIB 372 through port A of the port switch 380 is provided by setting the enable signal En_A to a high state, thereby enabling the logical AND gate 381. Routing of signals from the RCPB 371 to port B of the port switch 380 for delivery to the display unit 200 is provided by the appropriate selection signal to the multiplexer 385 and through enabling of the transmitting gate 386 by setting the enable signal En_B to the high state. Furthermore, the enable signal En_0 is set to a low state. Accordingly, full duplex communications between the physical layer and the demultiplexer 130 may be provided. Note further that, as shown in FIG. 7g, it may sometimes be desirable to provide the ISO output from a source generator unit 100 to the display unit 200 without also placing the output on the physical layer. While not shown in FIG. 7g, this may be accomplished through the use of the demultiplexer 130 which may selectively not provide signals from the tuner 120 to port A of the port switch 380. Alternatively, at selected times during full duplex operations, the enable signal En_A may be set to the low state to block transmission of the signals to the TSIB 372 as shown in FIG. 7g.

Accordingly, as described with reference to the figures above, the full duplex interface apparatus for high performance serial bus of the present invention provides a plurality of ports enabling support of full duplex communications. As a result, bidirectional applications, such as picture in a picture (PIP) or television (TV) phone may be beneficially implemented through the use of the apparatus of the present invention. The present invention is particularly directed to providing an IEEE 1394 compliant full duplex interface apparatus and devices such a digital television system including the same.

As will be appreciated by those of skill in this art, the above-described aspects of the present invention in FIGS. 4–6 and 7a–7g may be provided by hardware, software, or a combination of the above. For example, while various components of the port switch 380 have been illustrated in FIGS. 5 and 6, in part, as discrete elements, they may, in practice, be implemented by a processor, such as a microcontroller, including input and output ports and running software code, by custom or hybrid chips, by discrete components or by a combination of the above. Similarly, for example, the transmitter 330 and the receiver 320 could be combined and provided as a transceiver which could be implemented by discrete logic hardware, application specific custom designed chips or, in part, as code executing on a programmable device such as a microprocessor.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A full duplex interface apparatus for a high performance serial bus, the apparatus comprising:
    an interface circuit having a transmit signal output coupled to the high performance serial bus and a receive signal input coupled to the high performance serial bus, the interface circuit being configured to receive isochronous signals from the high performance serial bus on the receive signal input and to transmit isochronous signals to the high performance serial bus on the transmit signal output;
    a port switch coupled to the interface circuit and having a first port and a second port, the first port and the second port being coupled to a demultiplexer; and
    wherein the port switch is configured to support full duplex communication of isochronous signals between the high performance serial bus and the demultiplexer through the first port and the second port.

2. An apparatus according to claim 1 wherein the high performance serial bus is an IEEE 1394 protocol serial bus.

3. An apparatus according to claim 2 wherein the isochronous signals are video signals.

4. An apparatus according to claim 1 wherein the isochronous signals are provided in a packet which includes a time stamp indicating location information for the packet relative to other packets communicated over the high performance serial bus and wherein the interface circuit comprises:
    a packet reconstruction circuit configured to read the time stamp from a received packet and determine a desired location for the received packet; and
    a time stamp insertion circuit configured to add a time stamp to a transmit packet indicating location information for the transmit packet relative to other packets generated by the source generator.

5. An apparatus according to claim 4 wherein the interface circuit comprises:
   a receive buffer that stores isochronous signals received from the high performance serial bus; and
   a transmit buffer separate from the receive buffer that stores isochronous signals received from the source generator.

6. An apparatus according to claim 5 wherein the first port is a bidirectional port and the second port is a unidirectional port supporting communication of isochronous signals from the demultiplexer to the high performance serial bus and wherein the first port supports communication of isochronous signals from the high performance serial bus to the demultiplexer during full duplex operations of the apparatus.

7. An apparatus according to claim 6 wherein the interface circuit includes an IEEE 1394 compliant connector and the transmit signal output and the receive signal input are coupled to the high performance serial bus through the IEEE 1394 compliant connector.

8. An apparatus according to claim 1 further comprising:
   an asynchronous signal interface circuit coupled to the high performance serial bus and configured to receive asynchronous signals from the high performance serial bus.

9. An apparatus according to claim 8 wherein the asynchronous signal interface circuit comprises:
   an interface having an output coupled to a controller associated with the source generator;
   a receive buffer coupled between the high performance serial bus and the interface; and
   a transmit buffer separately coupled between the high performance serial bus and the interface.

10. A full duplex interface apparatus for a high performance serial bus, the apparatus comprising:
    an interface circuit having a transmit signal output coupled to the high performance serial bus and a receive signal input coupled to the high performance serial bus, the interface circuit being configured to receive isochronous signals from the high performance serial bus on the receive signal input and to transmit isochronous signals to the high performance serial bus on the transmit signal output;
    a port switch coupled to the interface circuit and having a first port and a second port, the first port and the second port being coupled to a source generator unit;
    wherein the port switch is configured to support full duplex communication of isochronous signals between the high performance serial bus and the source generator through the first port and the second port; and
    wherein the port switch comprises:
      a first logic AND gate having a first input coupled to the receive signal input and a second input coupled to a first enable signal;
      a first transmit gate coupled to an output of the first logic AND gate and being responsive to a second enable signal, the first transmit gate providing a high impedance at an output of the first transmit gate when the second enable signal is deactivated, the output of the first transmit gate being coupled to the first port;
      a second logic AND gate having a first input coupled to the first port and a second input coupled to the first enable signal and an output coupled to the transmit signal output; and
      wherein the receive signal input is coupled to the second port.

11. An apparatus according to claim 10 further comprising:
    a buffer having an input coupled to the first port;
    a multiplexer having a first input port coupled to the receive signal input and a second input coupled to an output of the buffer;
    a second transmit gate having an input coupled to an output of the multiplexer and being responsive to a third enable signal and having an output coupled to the second port; and
    wherein the first input of the second logic AND gate is coupled to an output of the buffer.

12. An apparatus according to claim 11 wherein the isochronous signals are provided in a packet which includes a time stamp indicating location information for the packet relative to other packets communicated over the high performance serial bus and wherein the interface circuit comprises:
    a packet reconstruction circuit configured to read the time stamp from a received packet and determine a desired location for the received packet; and
    a time stamp insertion circuit configured to add a time stamp to a transmit packet indicating location information for the transmit packet relative to other packets generated by the source generator; and
    wherein the first input of the first logic AND gate is coupled to the packet reconstruction circuit and the output of the second logic AND is coupled to the time stamp insertion circuit and the first input port of the multiplexer is coupled to the packet reconstruction circuit.

13. An apparatus according to claim 12 further comprising:
    an asynchronous signal interface circuit coupled to the high performance serial bus and configured to receive asynchronous signals from the high performance serial bus.

14. An apparatus according to claim 13 wherein the asynchronous signal interface circuit comprises:
    an interface having an output coupled to a controller associated with the source generator;
    a receive buffer coupled between the high performance serial bus and a first input of the interface; and
    a transmit buffer coupled between the high performance serial bus and a second input of the interface.

15. A digital television system, comprising:
    an antenna for receiving air radio frequency signals transmitted from digital satellite or air waves;
    a tuner for selecting a desired channel among the received signals from the antenna;
    a demultiplexer for dividing signals transmitted from the tuner into audio signals and video signals;
    an audio decoder for decoding the divided audio signals and outputting the decoded signals to a speaker unit;
    a video decoder for decoding the divided video signals and outputting the decoded signals to a display unit; and
    an IEEE 1394 interface device comprising: a first port which interfaces the demultiplexer and IEEE 1394 cable, and transmits the external signals transmitted through the IEEE 1394 cable to the audio decoder or video decoder; and a second port which transmits the signals selected by the tuner to the IEEE 1394 cable to provide concurrent read and write between the demultiplexer and the IEEE 1394 cable.

16. The system of claim 15, wherein the IEEE 1394 interface device comprises:

a receiver for receiving the isochronous signals from the IEEE 1394 cable, the isochronous signals having a time stamp which indicates location information of the packet data;

a cycle monitor for monitoring the timing of the received isochronous signals;

a reconstruction packet block for analyzing the time stamp information of the received isochronous signals, and reconstructing the location movement of the packet data, the reconstruction occurring during transmission;

a port switch comprised of: the first port which transmits the reconstructed isochronous signals to the demultiplexer; and the second port which receives the isochronous signals selected by the tuner through the demultiplexer;

a time stamp inserting block for appending a time stamp to the isochronous signals which are transmitted from the port switch and selected by the tuner and indicates the location of the packet data of the isochronous signals;

a cycle timer for tuning the synchronizing timing of the isochronous signals generated in the time stamp inserting block according to the monitored results by the cycle monitor; and a transmitter for transmitting the tuned isochronous signals by the cycle timer to the IEEE 1394 cable.

17. The apparatus of claim 16, wherein the externally received signals through the bidirectional port and the IEEE 1394 cable are transmitted to the display unit, and concurrently the video signals generated by the source generator unit through the unidirectional port are transmitted to the IEEE 1394 cable.

18. The system of claim 16, wherein the second port of the port switch can receive the isochronous signals selected by the tuner.

19. The system of claim 18, wherein the port switch comprises:

a first logical AND gate in which the isochronous signal transmitted from the reconstruction packet block is provided to a first input terminal, and first enable signal is provided to a second input terminal;

a first transmitting gate in which an output signal of the first logical AND gate is provided to an input terminal, and the transmission of an output signal is determined by a second enable signals;

a buffer in which the isochronous signals generated in the source generator unit are provided from the first port;

a second logical AND gate in which output of the buffer is provided to a first input terminal, and the first enable signal is provided to a second input terminal, and an output signal of the second logical AND gate is provided to the time stamp inserting block;

a multiplexer for selecting a signal among an output signal of the first buffer and a signal from the reconstruction packet block; and a second transmitting gate in which an output signal of the multiplexer is provided to an input terminal, and an output signal of the second transmitting gate is provided to the second port, and transmission of the output signal is determined by the third enable signal.

20. The system of claim 18, wherein the system further comprises a first buffer which temporarily stores the isochronous signals transmitted from the receiver, and a second buffer which temporarily stores the isochronous signals transmitted from the port switch and selected by the tuner.

21. The system of claim 20, wherein the system further comprises a cycle redundancy checker (CRC) which checks for errors of the isochronous signals transmitted from the IEEE 1394 cable, and checks for errors of the isochronous signals transmitted from the transmitter.

22. The system of claim 21, wherein the system further comprises an interface apparatus which provides an interface for the receiver, the transmitter and the IEEE 1394 cable.

23. In an IEEE 1394 interface apparatus for providing an interface between a first system having a source generator unit generating isochronous video signals, and a display unit displaying the generated isochronous video signals, with an IEEE 1394 cable, said IEEE 1394 interface apparatus comprising:

a bidirectional port for concurrently transmitting external signals transmitted through the IEEE 1394 cable to the display unit, and transmitting the video signals generated in the source generator unit to the IEEE 1394 cable;

a unidirectional port for transmitting the video signals generated by the source generator unit to the IEEE 1394 cable.

* * * * *